United States Patent Office 3,483,279
Patented Dec. 9, 1969

3,483,279
MICHAELIS-ARBUZOV REACTION
Ralph A. Davis and Eric R. Larsen, Midland, Mich., assignors to The Dow Chemical Company, Midland, Mich., a corporation of Delaware
No Drawing. Filed Mar. 11, 1966, Ser. No. 533,412
Int. Cl. C07f 9/40, 9/46; C07d 105/04
U.S. Cl. 260—969
6 Claims

ABSTRACT OF THE DISCLOSURE

An improved method is disclosed for carrying out the Michaelis-Arbuzov reaction wherein a phosphite is reacted with an organic halide to obtain a phosphonate, the improvement comprising conducting the reaction in a thin film reactor at a temperature of from about 190° to 260° C. Increased yields of the phosphonate product are obtained and undesired side reactions, which normally accompany conventional processes employed for carrying out this reaction, are substantially eliminated when the method of the invention is employed.

---

The present invention is concerned with the synthesis of phosphorus compounds and is directed, in particular, to an improved method for carrying out the reaction known generally as the Michaelis-Arbuzov reaction, and known in certain special embodiments as the Arbuzov rearrangement.

The Michaelis-Arbuzov reaction has long been known, the first publication on the subject having become available in about 1906 (J. Russ. Phys. Chem. Soc., 38, p. 687). Since that time, the reaction has been investigated extensively. As a result of these investigations, it has come to be accepted that the Michaelis-Arbuzov reaction, in its simplest form, comprises the reaction, with rearrangement, of a phosphite with an organic halide, to obtain a phosphonate, thus:

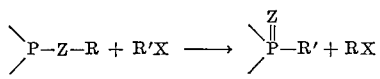

wherein Z is oxygen or sulfur, R is a hydrocarbyl or substituted hydrocarbyl radical, R' is a hydrocarbyl or substituted hydrocarbyl radical having at its point of attachment to X a moiety selected from the group consisting of carbonyl and an aliphatic carbon atom, and X is halo. However, in certain instances wherein an ester group of the phosphite reactant bears, itself, a halogen atom bonded to a carbonyl moiety or to an aliphatic carbon atom, the presence of any separate organic halide reactant is unnecessary, the Michaelis-Arbuzov reaction going forward merely upon heating, thus:

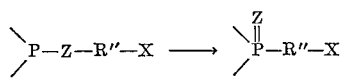

R″ being a divalent hydrocarbonylene or substituted hydrocarbonylene radical having at its point of attachment to X a moiety selected from the group consisting of carbonyl and an aliphatic carbon atom which is a β carbon atom with respect to the Z atom, or which is a carbon atom yet further removed from the Z atom. In this simple and autogenous action, the reaction is frequently spoken of as the Arbuzov rearrangement, and constitutes a specialized embodiment of the generic Michaelis Arbuzov reaction.

In some instances, however, this reaction is not limited to simple rearrangement: instead such compound simultaneously undergoes rearrangement as well as reaction in accordance with the standard Michaelis-Arbuzov reaction, thus:

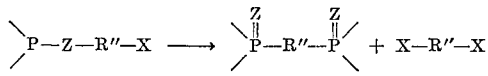

This embodiment of the Michaelis-Arbuzov reaction is typically found in the instance wherein the phosphite reactant comprises at least one substituent on the phosphorus atom, other than the specified —Z—R″—X substituent, which is aromatic.

The scope of reactants available for the reaction has been defined in the course of the investigations carried out since 1906. It has come to be known (see "Organophosphorus Compounds," Kosolapoff, John Wiley & Sons, Inc., New York, 1950, chapter 7) that all that is critical to the reaction is (1) that the phosphite reactant embody a trivalent phosphorus atom that carries an ester group, hence $$\diagdown P-Z-R \quad \text{or} \quad \diagdown P-Z-R''-X$$

and (2) that the R' group of a separate organic halide reactant or the R″ group where the phosphite itself contains reactive halogen have at its point of attachment to X a moiety selected from the group consisting of carbonyl and an aliphatic carbon atom; in addition, in the instance of R″, it is critical that the halogen (X) be attached to a carbon atom which is a β carbon atom with respect to the Z moiety, or to a carbon atom which is yet further removed from the Z moiety.

The moieties of the phosphite reactant other than the $$\diagdown P-Z-R \quad \text{or} \quad \diagdown P-Z-R''-X$$

moiety do not participate in this reaction and hence their identity is not critical. For example, the reaction goes forward with phosphite esters:

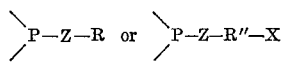

with phosphonite esters:

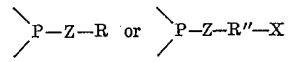

and with phosphinite esters:

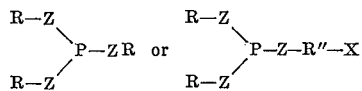

or, expressed most generically, with any compound of the formulae

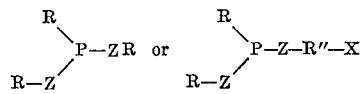

where each R, taken separately, independently represents hydrocarbyl or substituted hydrocarbyl, or two R groups, taken jointly, together represent a divalent radical which with the phosphorus atom represents a cyclic unit; and each of m and n independently is an integer of from 0 to 1. In the instance of phosphite and phosphonite esters wherein not all Z moieties are the same, mixtures of products result. Nonetheless, the reaction goes forward and the resulting mixtures can be separated in conventional procedures.

It is well known in the literature ("Organic Name Reactions," Krauch et al., John Wiley & Sons, Inc., New York, 1964, page 17, and references there cited, particularly "Organophosphorus Compounds," loc. cit. and references there cited) that the identity of the R groups is not critical. Representative and preferred hydrocarbyl (R) groups, when R is taken separately, include alkyl, alkenyl, alkynyl, cycloalkyl, aryl, aralkyl, alkaryl, radicals derived from heterocyclic ring systems, and the like. Any R group can be substituted with one or a plurality of typical substituent radicals, the identity of which is not critical. Representative substituent radicals include carboxy or a carboxy ester, cyano, halo, carbamoyl, amino, formyl, hydroxy, mercapto, halocarbonyl, and ether or thioether groups. In the instance of phosphite and phosphonite esters of which not all ester R groups are identical, the reaction procedes in accordance with the respective reactivity of the groups. Where the reactivities are approximately the same, the reaction generally yields mixtures of products; these can be separated in conventional procedures.

Similarly, in the instance of a separate organic halide reactant, or in the instance of a

>P—Z—R″—X reactant, the identity of the R′ or R″ moiety is not critical, except as previously set forth. Hence, representative and preferred R′ moieties include hydrocarbacyl, alkyl, alkenyl, alkynyl, aralkyl, and cycloalkyl and representative R″ moieties include the corresponding divalent moieties which have at least two carbon atoms. These R′ and R″ moieties can be substituted as previously described for R. The halogen atom (X) can be iodine, bromine, or chlorine, and the term is so employed in the present specification and claims. Organic polyhalides are often employed, and usually undergo multiple reaction.

Where either the phosphite reactant or the halide reactant involves a cyclic unit, such as a cycloalkyl moiety, a heterocyclic ring, or, in the instance of the phosphite ring, a ring of which the phosphorus atom is a ring member, the rings are of any size which does not interfere with the progress of the reaction. Generally a ring size of from 5 to 7 ring atoms is preferred and does not interfere. Where the phosphite reactant or organic halide reactant involves a hydrocarbyl, substituted hydrocarbyl, hydrocarbonylene, substituted hydrocarbonylene, or hydrocarbacyl unit, such unit is similarly of any size which does not interfere with the progress of the reaction. Generally, units of from 1 to 18 carbon atoms are employed and do not interfere.

Thus, the Michaelis-Arbuzov reaction, in its embodiment which involves a separate organic halide, is described as being a reaction of a phosphite of the formula:

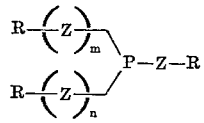

with an organic halide

R′X the Arbuzov rearrangement embodiment of the Michaelis-Arbuzov reaction is a rearrangement of a compound of the formula

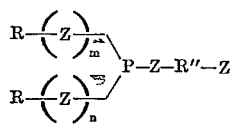

and the very broad scope of optional substituents upon the reactants in either embodiment is well known.

While the literature is unanimous as to the versatility of the Michaelis-Arbuzov reaction, it is also unanimous that the reaction has been generally of low efficiency, very slow, and usually batchwise. Yields have generally been low. Moreover, it has been necessary to keep the reaction temperature relatively low, such as below 150° C., to avoid side reactions such as polymerization; However, this is disadvantageous in that it conduces to low efficiency. For these reasons the Michaelis-Arbuzov reaction has found limited practical application.

There has now been discovered an improved method for carrying out the Michaelis-Arbuzov reaction. This method comprises the step of conducting the reaction (1) in a thin-film reactor; and
(2) at a temperature of from 190° to 260° C. In this improved method the reaction time per mole is extremely short, and side reaction occurs to only a negligible degree. Accordingly, the product of the reaction is obtained in high yield and in a high degree of purity. Moreover, in this improved method, the reaction is readily carried out as a continuous process.

As is known by those skilled in the art, a thin film reactor is a device which spreads a thin film of liquid reaction medium on one side of an impervious surface, heat being supplied to or removed from the other side of the surface. The precise structure of the reactor is not critical, a number of diverse structures being known. Those which are commercially available generally comprise a metal cylinder surrounded by a heat-exchange jacket, and are designed to disperse the liquid reaction medium along the internal surface of the cylinder, heat exchange being effected through the surface of the cylinder. In general, the thickness of the reacting film is in the range of 0.03 to 0.10 inch. Devices to regulate film thickness are sometimes employed; however, in many such devices, the cylinder is positioned with its axis in a vertical direction and film thickness is uneven, and limited by fall of the film due to gravity.

Of particular interest in the practice of the present invention are those thin film reactors described as "agitated." In these reactors, usually positioned with the cylinder axes in a horizontal direction, a mechanical member located within the cylinder and revolving therewithin serves to keep the film of its desired thickness and also usually to propel the liquid through the cylinder. A detailed discussion of such agitated thin film reactors is found in volume 72, number 19 of Chemical Engineering (Sept. 13, 1965), pages 175–190, inclusive.

In carrying out the method of the present invention, the reactant or reactants or a solution comprising the reactant or reactants in an inert liquid reaction medium, are fed into the thin film reactor with the heating jacket at a temperature of from 190 to 260° C. The amount of reactant or reactants fed into the reactor per any given unit of time is not critical and can vary over a wide range, depending upon the reactivity of the specific materials being employed and upon the size and type of reactor employed. Feed rates of from 0.5 to 150 pounds per hour are typical. In the instance of a non-agitated thin film reactor, where residence time is controlled by gravity, a feed rate of from 1 to 10, preferably from 5 to 8, pounds per hour has been found to be satisfactory in the practice of the present invention, with a reactor having a surface area of about 1 square foot. In the instance of an agitated reactor, more precise control of the residence time can be achieved by the agitation provided. Here, as in the instance of the non-agitated film reactor, feed rates are dependent upon reactivity of the specific materials and upon the size of the reactor. However, unlike the non-agitated reactor, the possible feed rate of an agitated reactor of a given size can readily exceed the reactivity of specific materials. Thus, in the instance of an agitated thin film reactor having a surface area of about one square foot and a potential feed rate of 100 pounds per hour, it has been found satisfactory to employ near capacity rates, such as rates of from 60 to 100 pounds, for highly reactive materials, and lower rates, such as rates of from 10 to 15 pounds per hour, for less reactive materials.

Relative reactivites are known in the art: the usual decrease in reactivity from iodo to bromo is found. Also, an increase in molecular size in any given class correlates with a decrease in reactivity. Further, phosphinites are more reactive generally than phosphonites, which in turn are more reactive generally than phosphites. For the effective utilization of equipment, it is preferred to use the highest feed rates that the reactivity of the materials and the capacity of the reactor will permit.

When the method of the present invention is carried out with a reactant which has a boiling point below the temperatures at which the method of the present invention is practiced, it is prefered that the reaction be carried out under superatmospheric pressures, preferaby pressures which are autogeneous as regards the reactant. The falling film type of thin film reactor does not admit of being employed with superatmospheric pressure; hence, the agitated thin film reactor is preferred in such an embodiment.

Operating at such feed rates as above set forth, the reaction times are generally on the order of seconds and minutes. Hitherto, reaction times for the Michaelis-Arbuzov reaction have been generally hours or days.

The thin film reactor is preferably provided with means to remove promptly from the reaction zone any by-product of the sort prepared when a separate organic halide reactant is employed:

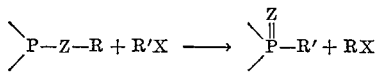

or by-product of the sort prepared when a phosphite reactant undergoes both reaction and rearrangement:

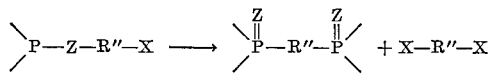

The RX or XR″X by-product, if permitted to remain, may become involved in side reactions, particularly if, in the instance of the former of the two reactions, R′ and R are not identical; hence its prompt removal is preferred. Means for accomplishing this are known in the art.

The following examples illustrate the present invention, including the best mode now known, and will enable those skilled in the art to practice the present invention.

EXAMPLE 1

A falling film reactor having a surface area of about one square foot was set up. Heating was accomplished with circulated triethylene glycol at a temperature of 200° C. Tris(2-bromoethyl)phosphite, known to be contaminated by minor amounts of ethylene oxide and ethylene dibromide, was pumped into the top of the reactor at a rate of 7.7 pounds per hour. The bis(2-bromoethyl) (2-bromoethyl)phosphonate product, as well as unreacted phosphite, were drained from the bottom of the reactor. After 6⅔ hours of operation, 51.5 pounds of product were obtained, representing a 97.2 percent conversion. The product was analyzed and found to be of about 95 percent purity: the impurities comprised about 2 percent of each of ethylene dibromide and ethylene oxide and about 1 percent of an unidentified acidic material.

EXAMPLE 2

The Arbuzov rearrangement was run with a tris(bromopropyl)phosphite material on an agitated thin film reactor having a surface area of one square foot. In the tris(bromopropyl)phosphite the ester groups comprised a mixture of isomers, predominantly the (2-bromo-1-methylethyl), the balance being (2-bromopropyl). The material was known to contain a minor amount of propylene oxide.

The heating jacket of the reactor was set at a temperature of 200° C.; however, during the course of operation, the temperature rose at the exit of the reactor to 220° C., due to heat of reaction. The film was calculated to be of a thickness of less than 0.05 inch. 490 pounds of the tris(bromopropyl)phosphite was fed to the reactor at a rate of 60 pounds per hour, with a residence time of 23 seconds. The output of the reactor comprised 4 pounds of propylene oxide and 486 pounds of bis(bromopropyl) (bromopropyl)phosphonate product. The product was separated and analyzed. It was found to be of 98 percent purity.

EXAMPLE 3

The procedures of Example 2 were repeated employing tris(2-chloroethyl) phosphite, a feed rate of 10 pounds per hour with a residence time of 111 seconds, and a temperature of 250–255° C. The resulting bis(2-chloroethyl) (2-chloroethyl)phosphonate product represented an 80 percent conversion of starting material and was found by infrared analysis to be of about 90–95 percent purity, unreacted starting material being the only observed impurity.

EXAMPLE 4

A falling film reactor having a surface area of about 0.218 square foot was set up. The reactor was maintained at a temperature of about 213° C., while a mixture comprising 10 grams of triethyl phosphite (0.0602 mole) and 11 grams of phenethyl bromide (0.0595 mole) was fed into the reactor over a period of fifteen minutes. This feed rate represented a contact time of about 2 minutes. The output from the reactor was recycled twice. The resulting material was then evacuated at 5 millimeters pressure on a steam bath to remove ethyl bromide by-product and unreacted triethyl phosphite starting material.

Thereafter, the resulting product material was analyzed by infrared spectroscopy and found to consist of essentially the expected product, diethyl phenethylphosphonate.

In further operations, other products are prepared in accordance with the present invention, in good yields:

Diphenyl (2-chloroethyl) phosphite is reacted, under conditions employed in Example 2, to yield tetraphenyl ethylenediphosphonate.

Diisopropyl phenylphosphonite is reacted with isopropyl iodide, in accordance with the procedures of Example 1, to yield isopropyl isopropylphenylphosphinate.

Trityl chloride is reacted with triethyl phosphite to obtain diethyl tritylphosphonate.

Benzyl bromide is reacted with diethyl phenylphosphonodithioate to yield ethyl benzylphenylphosphinodithioate.

Ethyl chloroacetate is reacted with triethyl phosphite to obtain diethyl (ethoxycarbonylmethyl)phosphonate.

Acetyl chloride is reacted with triethyl phosphite to obtain diethyl acetylphosphonate.

1,4-dichloro-2-butene is reacted with triethyl phosphite to give a good yield of diethyl (4-chloro-2-butenyl)phosphonate.

Trimethyl phosphite is reacted under autogeneous pressure with methyl bromide to obtain dimethyl methylphosphonate.

Triethyl phosphite is reacted under autogeneous pressure with methyl bromide to obtain diethyl methylphosphonate.

Diethyl (2-chloroethyl) phosphite is reacted with benzyl bromide to obtain ethyl (2-chloroethyl) benzylphosphonate.

Triethyl phosphite is reacted with propargyl bromide to obtain diethyl propargylphosphonate.

Triethyl phosphite is reacted with 1-chloro-2-butene to obtain diethyl 2-butenylphosphonate.

Methyl cyclic trimethylene phosphite:

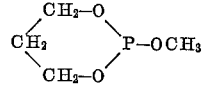

is reacted under autogeneous pressure with methyl bromide to obtain cyclic trimethylene methylphosphonate:

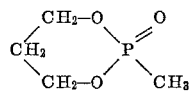

Diethyl vinyl phosphite is reacted under autogeneous pressure with methyl iodide to obtain ethyl vinyl methylphosphonate.

An especially preferred embodiment comprises the Arbuzov reararngement, in accordance with the method of the present invention, of a compound of the formula

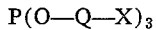

wherein X is as previously defined and Q represents a branched or straight-chain loweralkylene radical of from 2 to 4 carbon atoms, such as ethylene, propylene, trimethylene, tetrabutylene, and the like.

We claim:

1. In a method for carrying out the Michaelis-Arbuzov reaction, the improvement which comprises providing a liquid reaction mass which undergoes a Michaelis-Arbuzov reaction, passing a thin film of said liquid through a thin film reactor while maintaining the temperature at from 190 to 260° C., and recovering the resulting product.

2. The method as defined in claim 1 wherein the thickness of the liquid film is from about 0.03 to 0.1 inch.

3. The method as defined in claim 1 wherein the thin reacting film is agitated during passage through the reactor.

4. Method of claim 3 wherein the Michaelis-Arbuzov reaction is an Arbuzov rearrangement.

5. Method of claim 4 wherein the Arbuzov rearrangement is conducted with a tris(2-haloethyl) phosphite.

6. Method of claim 4 wherein the Arbuzov rearrangement is conducted with a tris(halopropyl) phosphite.

References Cited

UNITED STATES PATENTS

| | | | |
|---|---|---|---|
| 1,284,488 | 11/1918 | Steward | 23—1 |
| 1,629,200 | 5/1927 | Buhtz | 23—252 XR |
| 1,881,041 | 10/1932 | Benjamin | 23—1 |
| 2,507,490 | 5/1950 | Cohen | 23—1 |
| 3,256,370 | 6/1966 | Fitch et al. | 260—969 |
| 3,284,540 | 11/1966 | D'Alelio | 260—969 XR |

CHARLES B. PARKER, Primary Examiner

ANTON H. SUTTO, Assistant Examiner

U.S. Cl. X.R.

260—932, 935, 937, 941, 956, 961